(12) United States Patent
Arcangeli et al.

(10) Patent No.: US 11,061,829 B2
(45) Date of Patent: Jul. 13, 2021

(54) PREFETCH SUPPORT WITH ADDRESS SPACE RANDOMIZATION

(71) Applicant: Red Hat, Inc., Raleigh, NC (US)

(72) Inventors: Andrea Arcangeli, New York, NY (US); Michael Tsirkin, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 114 days.

(21) Appl. No.: 16/379,244

(22) Filed: Apr. 9, 2019

(65) Prior Publication Data

US 2020/0327071 A1 Oct. 15, 2020

(51) Int. Cl.
*G06F 11/00* (2006.01)
*G06F 12/14* (2006.01)
*G06F 11/07* (2006.01)
*G06F 21/60* (2013.01)
*G06F 12/10* (2016.01)
*G06F 12/12* (2016.01)

(52) U.S. Cl.
CPC ............ *G06F 12/14* (2013.01); *G06F 11/073* (2013.01); *G06F 11/0712* (2013.01); *G06F 11/0751* (2013.01); *G06F 12/10* (2013.01); *G06F 12/12* (2013.01); *G06F 21/604* (2013.01)

(58) Field of Classification Search
CPC .................................. G06F 12/10; G06F 12/12
See application file for complete search history.

(56) References Cited

U.S. PATENT DOCUMENTS

| 7,487,327 | B1 | 2/2009 | Chang et al. |
| 8,185,696 | B2 | 5/2012 | Vuletic et al. |
| 8,694,738 | B2* | 4/2014 | Bhattacharjee ....... G06F 12/145 711/151 |
| 8,832,382 | B2* | 9/2014 | Mayhew ............. G06F 12/1027 711/133 |
| 9,317,350 | B2 | 4/2016 | Cher et al. |
| 9,710,393 | B2* | 7/2017 | Lemay .................... G06F 21/00 |
| 10,311,227 | B2* | 6/2019 | Hughes .................... G06F 21/53 |
| 10,489,308 | B2* | 11/2019 | Bear .................... G06F 12/1063 |
| 10,528,735 | B2* | 1/2020 | Gorelik ................. G06F 21/566 |

(Continued)

OTHER PUBLICATIONS

Bo Fang, Qining Lu, Karthik Pattabiraman, Matei Ripeanu, Sudhanva Gurumurthi; "ePVF: An Enhanced Program Vulnerability Factor Methodology for Cross-layer Resilience Analysis"; https://www.cs.virginia.edu/~gurumurthi/papers/dsn16.pdf; Publication in 2016; Retrieved on or before Jan. 4, 2019; Department of Electrical and Computer Engineering University of British Columbia; Cloud Innovation Lab, IBM; 12 Pages.

(Continued)

*Primary Examiner* — Jonathan D Gibson
(74) *Attorney, Agent, or Firm* — K&L Gates LLP

(57) ABSTRACT

A system includes a memory, a processor in communication with the memory, an application, and a supervisor. The supervisor is configured to allocate an identifier corresponding to a virtual memory area and expose a data structure that is readable by the application. Responsive to a fault trigger associated with an address, the supervisor is configured to record fault information in the data structure. The application is configured to predict at least a portion of subsequent fault information based on fault information recorded in the data structure.

18 Claims, 5 Drawing Sheets

(56) References Cited

U.S. PATENT DOCUMENTS

| | | | | |
|---|---|---|---|---|
| 2013/0091318 | A1* | 4/2013 | Bhattacharjee | G06F 12/145 |
| | | | | 711/6 |
| 2013/0166834 | A1* | 6/2013 | Mayhew | G06F 12/10 |
| | | | | 711/105 |
| 2017/0060743 | A1* | 3/2017 | Kumar | G06F 12/1009 |
| 2018/0081559 | A1* | 3/2018 | Stabrawa | H04L 67/1097 |
| 2018/0307607 | A1* | 10/2018 | Sato | G06F 12/1009 |
| 2019/0065301 | A1* | 2/2019 | Tsirkin | G06F 11/0715 |
| 2019/0179767 | A1* | 6/2019 | Tsirkin | G06F 12/1009 |
| 2020/0293456 | A1* | 9/2020 | Ramadoss | G06F 12/1009 |
| 2020/0327071 | A1* | 10/2020 | Arcangeli | G06F 21/604 |

OTHER PUBLICATIONS

Daniel Gruss, Clémentine Maurice, Anders Fogh, Moritz Lipp, Stefan Mangard; "Prefetch Side-Channel Attacks: Bypassing SMAP and Kernel ASLR"; Published Oct. 2016; Graz University of Technology, G DATA Advanced Analytics; 12 Pages.

* cited by examiner

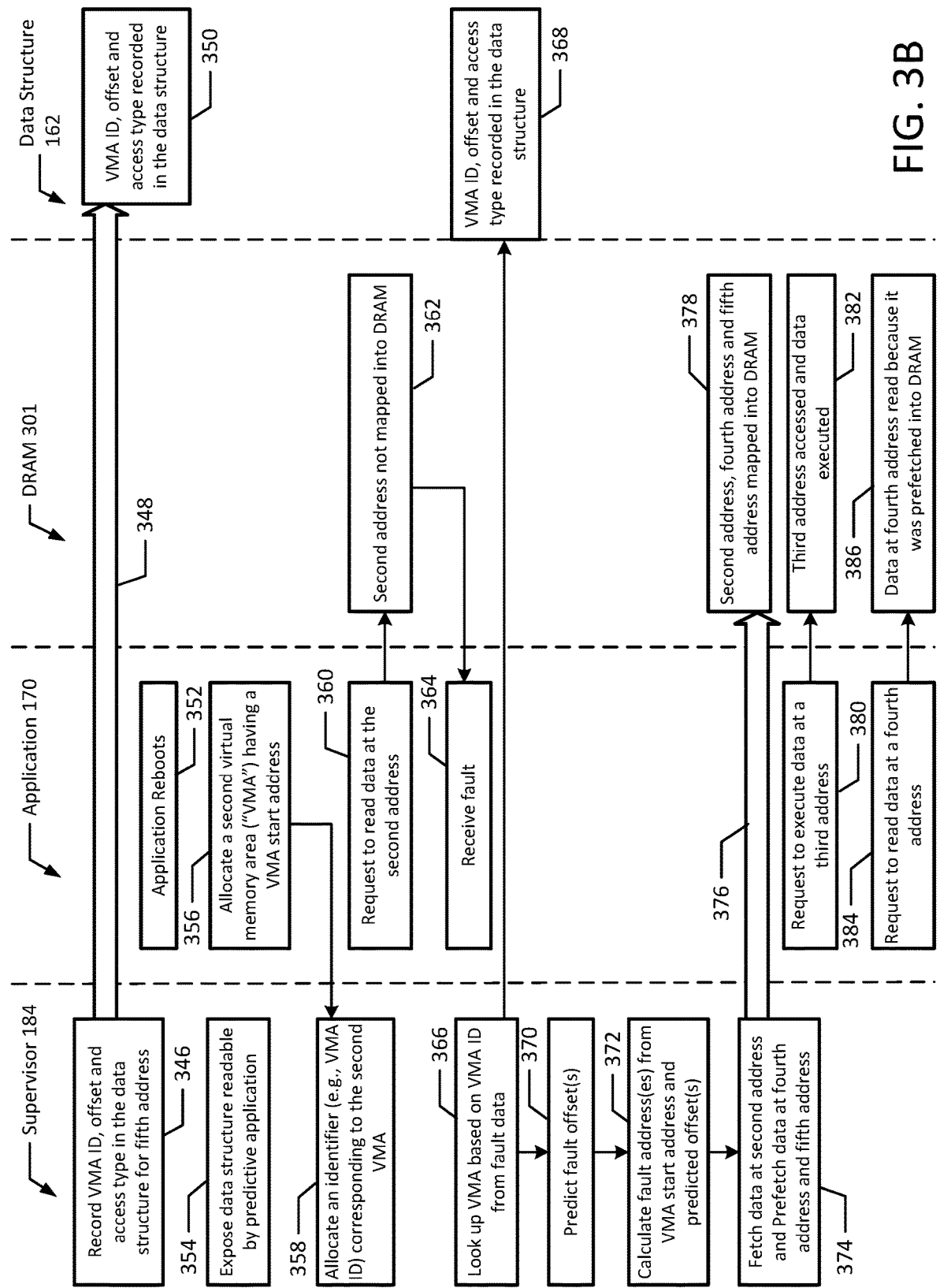

PREFETCH SUPPORT WITH ADDRESS SPACE RANDOMIZATION

BACKGROUND

Operating systems support a wide variety of memory types including rotating disks, flash, non-volatile random-access memory ("NVRAM"), dynamic random-access memory ("DRAM"), etc. The different memory options have different speed characteristics. In some instances, memory addresses may be randomized to prevent unauthorized access to memory addresses in computer systems. If a malicious actor determines the virtual location in memory of critical system components such as system libraries running at an higher privilege context, the malicious actor may utilize the location information to bypass security hardening features like the non executable stack in order to run attacker controlled code at higher privilege at the known virtual address location with a technique called ROP ("Return Oriented Programming"). Other attacks like the spectre-v2 speculative execution vulnerability also require knowledge of the virtual location of ROP gadgets to execute them in CPU speculative context. A state of the art Operative System Kernel security hardening feature consists in randomizing all the virtual memory addresses where executables, librarians, heap, data and stacks are located. Its objective is to prevent exploitation of software or hardware vulnerabilities and it's called address space layout randomization ("ASLR").

SUMMARY

The present disclosure provides new and innovative systems and methods to support page fault prefetch support while still supporting the address space layout randomization ("ASLR") feature. In an example, a system includes a memory, a processor in communication with the memory, an application, and a supervisor. The supervisor is configured to allocate an identifier (e.g., a sequence counter identifier) corresponding to a virtual memory area ("VMA") and configured to expose a data structure that is readable by the application (e.g., predictive application) which may include the sequence counter identifier and the size of the virtual memory area. The virtual memory area location randomly changes at every execution of the program to provide the ASLR feature, but the newly introduced sequence counter identifier and the size of the virtual memory area will tend to be similar at every run. Responsive to a fault trigger associated with an address, the supervisor is configured to record the virtual address fault information in the data structure to expose fault information to the application (e.g., predictive application) along with the sequence counter identifier and the size of the VMA. The application (e.g., predictive application) is configured to predict at least a portion of subsequent fault information based on the stream of recorded information.

In an example, a method includes allocating, by a supervisor, an identifier (e.g., a sequence counter identifier) corresponding to a VMA (and perhaps also the size of the VMA) and exposing by the supervisor, a data structure that is readable by the application. Responsive to a fault trigger, the supervisor records the fault virtual address information in the data structure. In an example, the supervisor also records the sequence counter identifier of the VMA where the fault occurred and the size of the VMA in the data structure. Additionally, the application predicts at least a portion of subsequent fault information based on the fault information recorded in the data structure.

In an example, a non-transitory machine readable medium stores code, which when executed by a processor, causes a supervisor to allocate an identifier (e.g., a sequence counter identifier) corresponding to a VMA. The VMA may be newly created by a user application. The supervisor exposes the identifier (e.g., a sequence counter identifier) in a data structure that is readable by an application (e.g., predictive application). Additionally, the supervisor may expose the sequence counter identifier along with the VMA size. Responsive to a fault trigger associated with an address, the supervisor is caused to record the fault virtual address information in the data structure and the supervisor predicts at least a portion of subsequent fault information based on the fault information (e.g., virtual address, sequence counter identifier of the associated VMA, and the size of the VMA) recorded in the data structure.

Additional features and advantages of the disclosed method and system are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE FIGURES

FIGS. 3A and 3B illustrate a flow diagram of an example process for prefetch support with address space randomization according to an example embodiment of the present disclosure.

DETAILED DESCRIPTION OF EXAMPLE EMBODIMENTS

Figure 1:
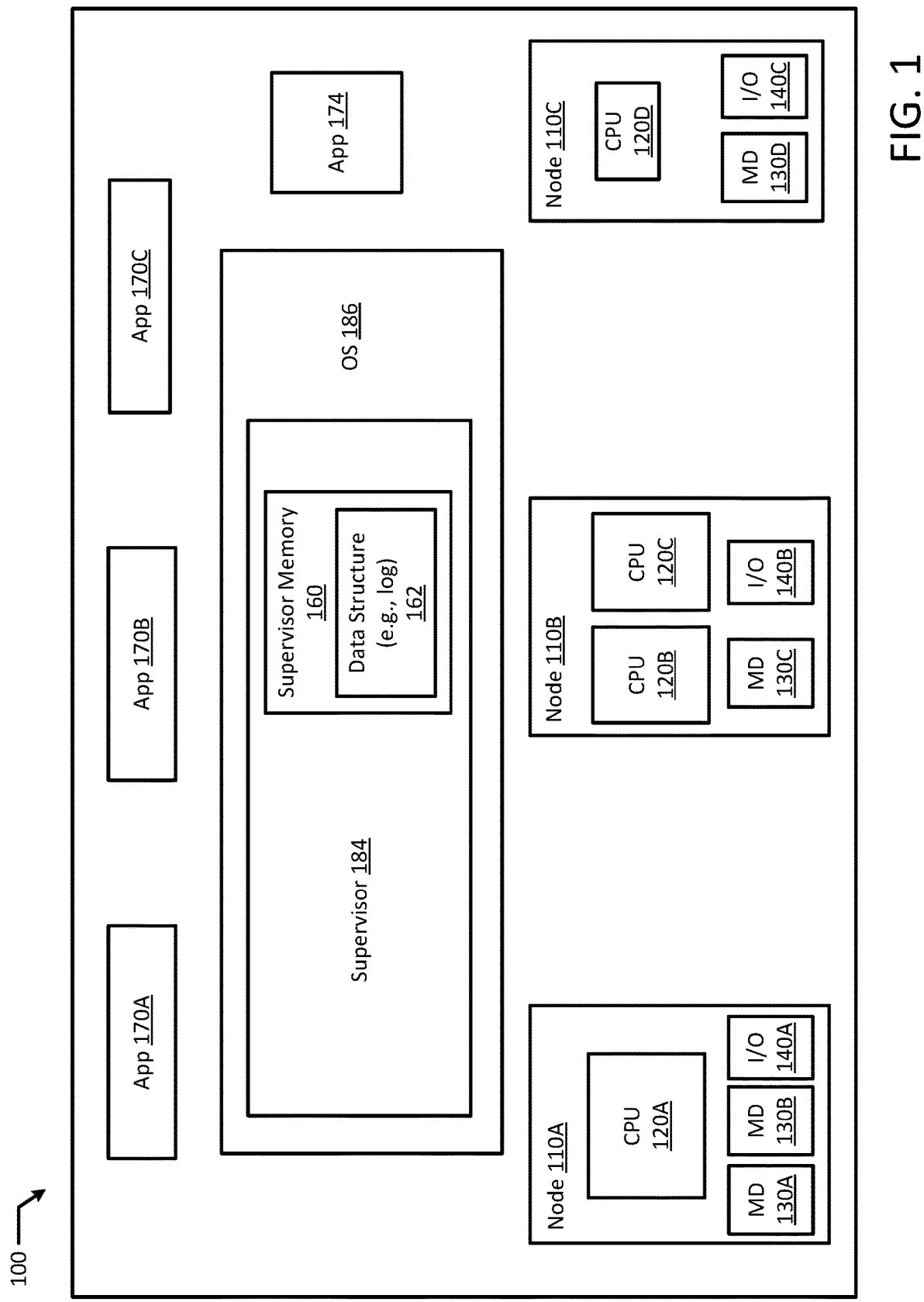
FIG. 1 illustrates a block diagram of an example computer system according to an example embodiment of the present disclosure.

Techniques are disclosed for prefetch support with address space layout randomization ("ASLR"). ASLR is a commonly implemented security feature involving the randomization of the memory addresses where a given component is loaded into memory, especially for kernel components. Kernel address space layout randomization is commonly referred to as ("KASLR").

In typical computer systems, operating systems support a wide variety of memory types including rotating disks, flash, NVRAM, DRAM, etc. Each of the different memory types may have different speed characteristics. To improve performance, a CPU typically utilizes the fastest DRAM option for often-used data. Whenever the CPU needs data that is not in DRAM, the CPU accesses an address, which is not mapped into DRAM, and this causes a fault. For example, in typical computer systems, there may be more data referenced by executing applications (both applications executing on physical hardware and those in virtualized guests on the physical hardware) than there is physical memory available on the system. Typically, memory virtualization is implemented to allow physical memory to be shared among these various processes. For example, data may be loaded to physical memory when it is needed for a program to execute, and then moved to slower storage such as hard disk when the data is not being accessed. In an example, memory paging is implemented to track the virtual addresses of the data of executing applications.

After the fault triggers, the system switches into a supervisor, which can fetch data from slower storage. However, while the system switches to the supervisor for fetching the data, the current task is blocked. To reduce the downtime and improve speeds, it is advantageous for the supervisor to predict or guess the next address that will be used and prefetch the data ahead of time. However, predicting and prefetching fault data is difficult because of ASLR. For example, ASLR may be implemented to impede attacks that purposefully overrun a fixed size buffer to place data in an area in memory that should not have been known by the malicious actor.

ASLR impedes these types of attacks by randomizing the locations in memory for shared libraries and parts of shared libraries each time an executable program is loaded into memory. However, in systems where one copy of a shared library is preloaded into the memory at a static location, which is then "prelinked" to each new executable program referencing the shared library, ASLR cannot function as intended because the shared library is not being reloaded to a random location. A malicious actor may then discover the location in memory of a shared library that is commonly used with elevated rights (e.g., libc, a library for generating the runtime environment for code written in the c programming language commonly used in operating system components), and use that location information to target memory addresses for an attack. Due to the conflict between "prelinking" and ASLR, administrators of computer systems generally have to choose between faster performance in the form of faster application loading from implementing a "prelinking" style of preloading shared libraries in memory versus higher security against attack by implementing ASLR.

As discussed in the various example embodiments disclosed herein, to improve performance and enable the supervisor to prefetch data from additional addresses while maintaining the higher security of ASLR, virtual memory areas ("VMAs") may be allocated a VMA ID in the VMA's task structure. The VMA may include a VMA start address. The supervisor may expose a data structure (e.g., log or log data structure) readable by userspace applications and each time a fault triggers, the supervisor may record fault information in the log data structure. Specifically, the supervisor may record fault information in the form of a fault structure that includes the VMA ID, an offset (e.g., random address minus the VMA start address), and the fault direction or type of access (e.g., read, write execute, etc.). Even though the address is randomized due to ASLR, the start address of the VMA may not be random and the userspace application can predict the next application fault offset.

Additionally, the offset is typically not randomized and is typically repeatable across reboots. In an example, a machine learning based application may collect fault information (e.g., fault statistics) during training to predict fault offsets because the same or similar patterns will likely apply for later runs of the same workloads. The fault information may be used to predict subsequent fault structures. When the supervisor exposes a new interface through which it receives fault data about the predicted fault offset and VMA ID, the supervisor may lookup the VMA based on the VMA ID and calculate the address (e.g., VMA start address+offset). The supervisor may also calculate the fault offset from the VMA start address and the fault address identified in the fault information. Then, the supervisor may advantageously speculate the fault and prefetch the fault data into memory. By prefetching the fault data into memory, the supervisor can provide additional memory entries in DRAM to improve the speed and performance of the CPU without sacrificing the security of ASLR. Specifically, the disclosed systems and methods advantageously provide a novel way to apply artificial intelligence ("AI") and machine learning or other statistical methods or heuristics to make a more advanced prediction about the next fault address of a user application or program, but without sacrificing the higher security against attack by maintaining the ASLR. Without the VMA ID and the derandomization of the fault address it would not be possible to present proper input data to the deep neural network or the heuristic whose task is to make a prediction, because of the inherent randomization of the fault address applied by the ASLR for every execution of the program. Additionally, by using an intelligent prediction, the supervisor may (i) prefetch data from normal cache, (ii) read a page that triggered the fault and read other pages around the fault trigger (e.g., fault around), and (iii) prefetch data far away from the page that triggered the fault that is well beyond the pages prefetched by faulting around.

The current state of the art in page fault prefetching (e.g., in Linux) utilizes the fault around logic, which does not try to make any accurate predictions and does not try to detect repetitive patterns in fault addresses, but instead only makes a general assumption that nearby virtual addresses are more likely to be used by the application than far away ones. Moore's law is predicted to end by 2025 according to most hardware forecasters, however, the number of CPUs and CPU cores in every computer and especially across different compute nodes keeps increasing steadily. It may be advantageous or beneficial to dedicate some of those CPU cores to accelerate the single threaded execution of the other CPU core running user applications because CPU single threaded performance is a more scarce resource than the number of idle CPU or GPU cores. The application (e.g., predictive application) that makes the prediction based on the enhanced VMA information with the sequence counter identifier and the fault virtual offset may run in user mode or the application (e.g., predictive application) may be injected in supervisor mode as extended Berkely Packet Filter ("eBPF") bytecode to run in a JIT sandbox in supervisor context. Additionally, the application (e.g., predictive application) may run in normal supervisor context or the application (e.g., predictive application) may run in different cloud nodes dedicated to such the fault address prediction task. In an example, the application (e.g., predictive application) may make a prediction of the next address to pre-fault or may make a decision whether or not to fault around for each individual VMA ID.

FIG. 1 depicts a high-level component diagram of an example computer system 100 in accordance with one or more aspects of the present disclosure. The computing system 100 may include an operating system (e.g., OS 186), a supervisor 184, and nodes (e.g., nodes 110A-C). The computing system may also include a predictive application 174.

The supervisor 184 may be a program. For example, the supervisor 184 may be a program that constitutes the core of the OS 186. As used herein, the supervisor 184 may refer to a privileged software component of the OS 186. For example, the supervisor 184 may have the ability to change memory mappings for an application (e.g., Applications or Apps 170A-C). Additionally, the supervisor 184 may act as a controller of multiple processes including individual user processes within an application memory space. For example, the supervisor 184 may perform several tasks such as executing processes and handling interrupts. In an example, the supervisor 184 may be a daemon process that intercepts faults and may receive fault information and store fault information in a log, such as data structure 162.

Additionally a user may run programs or applications (e.g., Applications 170A-C) in the application memory space. An application (e.g., Applications 170A-C) may be an application in userspace, an application in a virtual machine, or an application located elsewhere, all of which make up the application memory space. As used herein, an application (e.g., Applications 170A-C) may refer to less privileged software without the ability to change memory mappings for itself. The supervisor 184 may provide basic services for the OS 186 that are requested by other parts of the OS 186 or by application programs. For example, the supervisor 184 may provide basic services such as memory management, process management, file management, and I/O management. In an example, the supervisor 184 may be part of a kernel.

The predictive application(s) 174 may be an application in userspace, an application in a virtual machine, or an application located elsewhere (e.g., in a different cloud or node), all of which make up the application memory space. In an example, predictive application 174 may run in a supervisor mode. For example, the predictive application 174 may be injected in supervisor mode as eBPF bytecode to run in a JIT sandbox in a supervisor context. The eBPF predictive application 174 may be auto-generated through profile guided optimization. In an example, the eBPF predictive application 174 may be injected into the kernel along with binary files or libraries.

In various example embodiments, the supervisor 184 may include supervisor memory 160. In an example, the supervisor memory 160 may include one or more supervisor memory pages. Additionally, the supervisor memory 160 may store a data structure 162 (e.g., log or log data structure) readable by user or userspace applications 170A-C, which may be referred to generally as application(s) 170. Each time a fault triggers, the supervisor 184 may record fault information in the log data structure 162. Specifically, the supervisor 184 may record fault information in the form of a fault structure that includes a virtual memory area ID associated with a VMA, an offset (e.g., random address from fault minus the VMA start address), and the fault direction or type of access (e.g., read, write execute, etc.).

The system may include several different VMAs for different applications (e.g., applications 170A-C) and different application instances. ASLR randomly arranges the positions of different VMAs of a process (executable, stack, heap, data, libraries, etc.) or an application to be different in every execution. In some cases, the VMA space used for randomization may be a small portion of the full VMA. For example, ASLR randomizes the starting position of contiguous blocks of virtual memory. Since ASLR is based upon the low chance of an attacker guessing the locations of randomly placed VMAs, security is increased by increasing the search space. ASLR is more effective (e.g., has increased security) when more entropy is present in the random offsets. Entropy may be increased by either increasing the amount of VMA space over which the randomization occurs or reducing the period over which the randomization occurs.

Because the ASLR cannot introduce artificial delays in the runtime of applications, typically the system increases VMA space randomization. For example, in some new chips coming to market, the x86-64 virtual address space has been increased by the hardware vendor from $2^{48}$ to $2^{57}$ bytes and that provides a tangible increase in ASLR entropy.

As noted above, even though the address (e.g., fault virtual address) and the start of the VMA are randomized due to ASLR, the fault offset from the start of the VMA, the enhanced execution dependent sequence counter identifier of the VMA and the VMA size, are typically not randomized. In an example, a machine learning based application 174 (e.g., predictive application) may collect fault information (e.g., fault statistics) during training to predict fault offsets because the same or similar patterns will likely apply for later runs of the same workloads. The fault information may be used to predict subsequent fault structures. For example, an application (e.g., predictive application 174) may predict subsequent fault structures. When the supervisor 184 exposes a new interface through which it receives fault data about the predicted fault offset and VMA ID, the supervisor 184 may lookup the VMA based on the VMA ID and calculate the address (e.g., VMA start address+offset). The supervisor may also calculate the fault offset from the VMA start address and the fault address identified in the fault information. Then, the supervisor 184 may advantageously speculate the fault and prefetch the fault data into memory. After performing tasks, the supervisor 184 may return control to the CPU (e.g., CPU 120A-D) that is accessing data for application (e.g., applications 170A-C). By prefetching fault data, downtime is minimized by reducing the frequency of switches into the supervisor 184, which blocks other tasks by the application (e.g., applications 170A-C).

The computer system 100 may include one or more nodes 110A-C. Each node 110A-C may in turn include one or more physical processors (e.g., CPU 120A-D) communicatively coupled to memory devices (e.g., MD 130A-D) and input/output devices (e.g., I/O 140A-C). Each node 110A-C may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc.

As used herein, physical processor or processor (e.g., CPU 120A-D) refers to a device capable of executing instructions encoding arithmetic, logical, and/or I/O operations. In one illustrative example, a processor may follow a Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-D refers to a volatile or non-volatile memory device, such as random access memory (RAM), read only memory (ROM), electrically erasable read only memory (EEPROM), or any other device capable of storing data. As discussed herein, I/O device 140A-C refers to a device capable of providing an interface between one or more processor pins and an external device capable of inputting and/or outputting binary data.

Processors (e.g., CPUs 120A-D) may be interconnected using a variety of techniques, ranging from a point-to-point processor interconnect, to a system area network, such as an Ethernet-based network. Local connections within each node, including the connections between a processor (e.g., CPU 120A-D) and a memory device 130A-D may be provided by one or more local buses of suitable architecture, for example, peripheral component interconnect (PCI).

Figure 2:
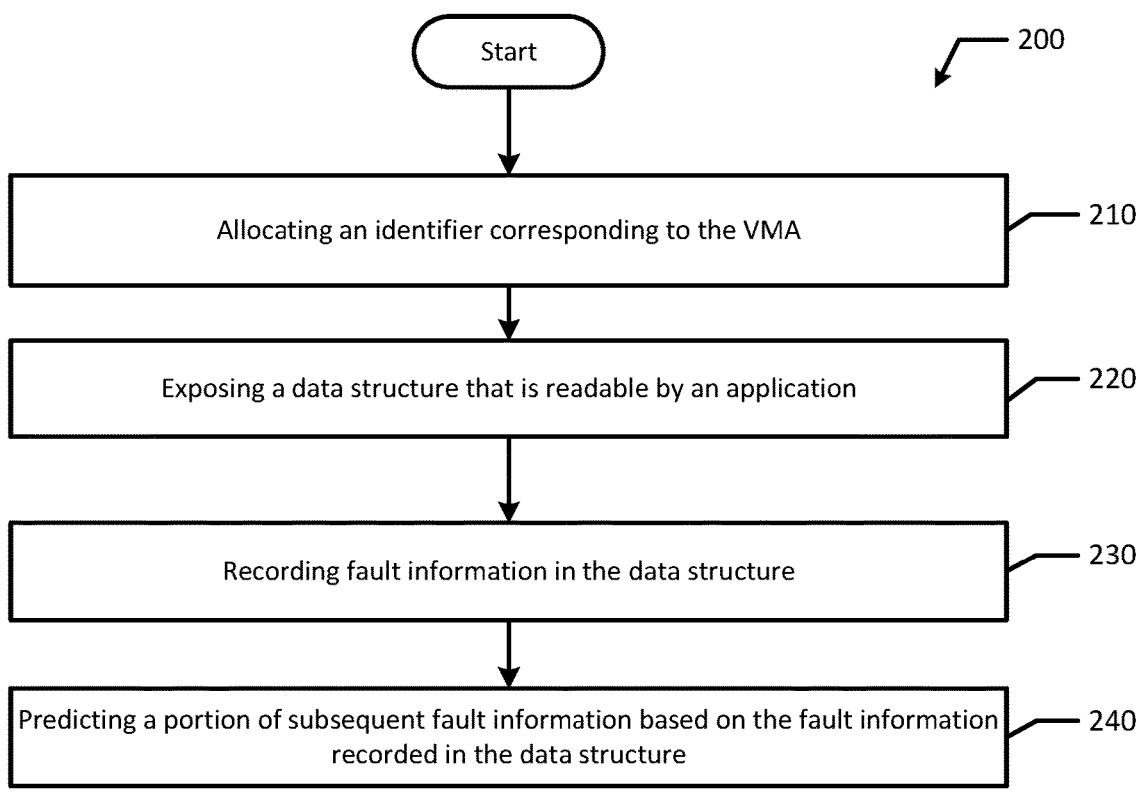
FIG. 2 illustrates a flowchart of an example process for prefetch support with address space randomization according to an example embodiment of the present disclosure.

FIG. 2 illustrates a flowchart of an example method 200 for prefetch support with address space randomization in accordance with an example embodiment of the present disclosure. Although the example method 200 is described with reference to the flowchart illustrated in FIG. 2, it will be appreciated that many other methods of performing the acts associated with the method 200 may be used. For example, the order of some of the blocks may be changed, certain blocks may be combined with other blocks, blocks may be repeated, and some of the blocks described are optional. The method 200 may be performed by processing logic that may comprise hardware (circuitry, dedicated logic, etc.), software, or a combination of both.

The example method 200 includes allocating an identifier corresponding to a VMA (block 210). For example, a supervisor 184 may allocate an identifier, such as a sequence counter identifier (e.g., VMA_ID=1), corresponding to the VMA. Specifically, the VMA ID may be auto auto-generated by the supervisor 184 when the VMA is created. The identifier (e.g., sequence counter identifier) may be a number (e.g., "1") in a task structure associated with the VMA. The identifier (e.g., sequence counter identifier) may also include other alphanumeric characters or designations. In another example, the VMA ID may be assigned to the VMA by a user application 170. For example, the VMA ID may be provided as a "hint" after the VMA is created. The "hint" may be provided using a syscall to assign the "hint". In an example, the "hint" may serve as a user application virtual-region-ID and may be assigned with a madvise( ) syscall by a user application 170.

A user application 170 may create a VMA. The VMA may define a virtual memory space allocated to the application 170. For example, the VMA may be a contiguous range of virtual addresses, such as 3 GB of userspace in 4 KB pages.

Additionally, the method includes exposing a data structure that is readable by an application (block 220). For example, the supervisor 184 may expose a data structure 162 that is readable by application(s) (e.g., predictive applications) 174. The data structure 162 may be a log data structure, which may be referred to herein generally as a "log". In an example, the log data structure 162 may be a training file or may store statistical data. Additionally, the data structure 162 may be stored in supervisor memory 160. In another example, the application (e.g., predictive application) 174 may run in a supervisor mode such that that information such as the VMA ID and the VMA size may be directly obtained from the VMA data structure itself instead of a separate data structure made readable from the application (e.g., predictive application) 174.

Method 200 also includes recording fault information in the data structure (block 230). For example, the supervisor 184 may record fault information in the data structure 162. Specifically, responsive to a fault trigger associated with an address, the supervisor 184 may record the fault information. When an application 170 attempts to access an address that is not mapped into DRAM, this may cause a fault trigger and the system may switch from the application 170 into the supervisor 184. Upon each fault trigger, the supervisor 184 may record the VMA ID (e.g., VMA ID=1), the offset (e.g., offset of "0x10"), and the fault direction or type of access (e.g., read). The offset may be calculated as the address minus the VMA start address. Additionally, the supervisor 184 may record the size of the VMA along with the VMA ID.

Additionally, method 200 includes predicting a portion of subsequent fault information based on the fault information recorded in the data structure (block 240). For example, the application (e.g., predictive application) 174 may predict at least a portion of subsequent fault information (e.g., the VMA ID, the offset or the type of access) based on the fault information recorded in the data structure. In an example, the size of the VMA may be used to prevent false positive VMA ID matches or predictions. For example, previous entries of fault information from the data structure 162 may be used to build a model for predicting subsequent fault information or entries. As fault information is received, the model may be used to predict future faults and calculate the addresses as the VMA start address plus the offset. Fault offsets may also be calculated from the VMA start address and the fault address identified in the fault information. In an example, the model may predict a pattern of subsequent fault information.

The model may be based on a training process with a sample workload or a sample application or process run. Then, actual fault data may be compared to the model built from the training process to predict future faults. Additionally, different models may be built for different workloads or environments. For example, models may be associated with specific system characteristics depending on the system configurations, software, and underlying hardware. In some examples, the models may be updated and optimized with the data collected from the actual run. For example, the model may update an expected pattern of fault addresses as more fault information is received. The models may also diverge based on application instances or workloads. For example, the same model may initially be used for different application instances, but over time, the models for each application instance may update into two different unique prediction models based on subsequent fault information received by the supervisor 184.

Then, the supervisor 184 may use these calculated addresses to prefetch data into memory (e.g., data from the predicted pattern of fault addresses). In an example, the supervisor 184 may prefetch data in the order of kilobytes or megabytes. For example, the supervisor 184 may prefetch approximately 2 kB to 2 MB of data before giving control back to the application 170. In some instances, the supervisor 184 may prefetch larger pages (e.g., 2 MB) to avoid having to prefetch other portions of nearby data. For example, instead of prefetching multiple 2 kB portions of data at different times, the supervisor 184 may prefetch larger portions (and up to the largest allowable portions) of data to reduce the latency involved with going to the disk multiple times to grab smaller portions of data. In some examples, the prediction model may indicate the amount of data to prefetch when a fault is triggered. For example, in one instance, the model may suggest prefetching 2 kB of data after a fault is triggered. However, when a fault is triggered later while the application 170 is running, the model may suggest prefetching a larger portion of data (e.g., 1 MB of data).

Additionally, unlike other techniques that receive a page fault and "fault around" in the same VMA, the systems and methods disclosed herein may predict subsequent faults far away from the page that triggered the fault that is well beyond the pages prefetched by faulting around. Additionally, the supervisor 184 may predict faults in other virtual memory areas and prefetch data that is also "far away" from the original fault trigger.

Furthermore, because the supervisor 184 (e.g., supervisor daemon) has restricted access to ASLR random bits, the supervisor 184 or kernel and other processes are advantageously protected. For example, in the case that the fault prediction application 174 runs as a daemon that only has access to the fault virtual offset and the associated sequence counter identifier of the VMA, even if a malicious entity had access to all data in the fault prediction application 174 in the daemon, which may cause a slow down by performing incorrect prefetches, the malicious entity would not break ASLR because all random bits of the ASLR do not need to be exposed to the malicious entity.

Figure 3A:
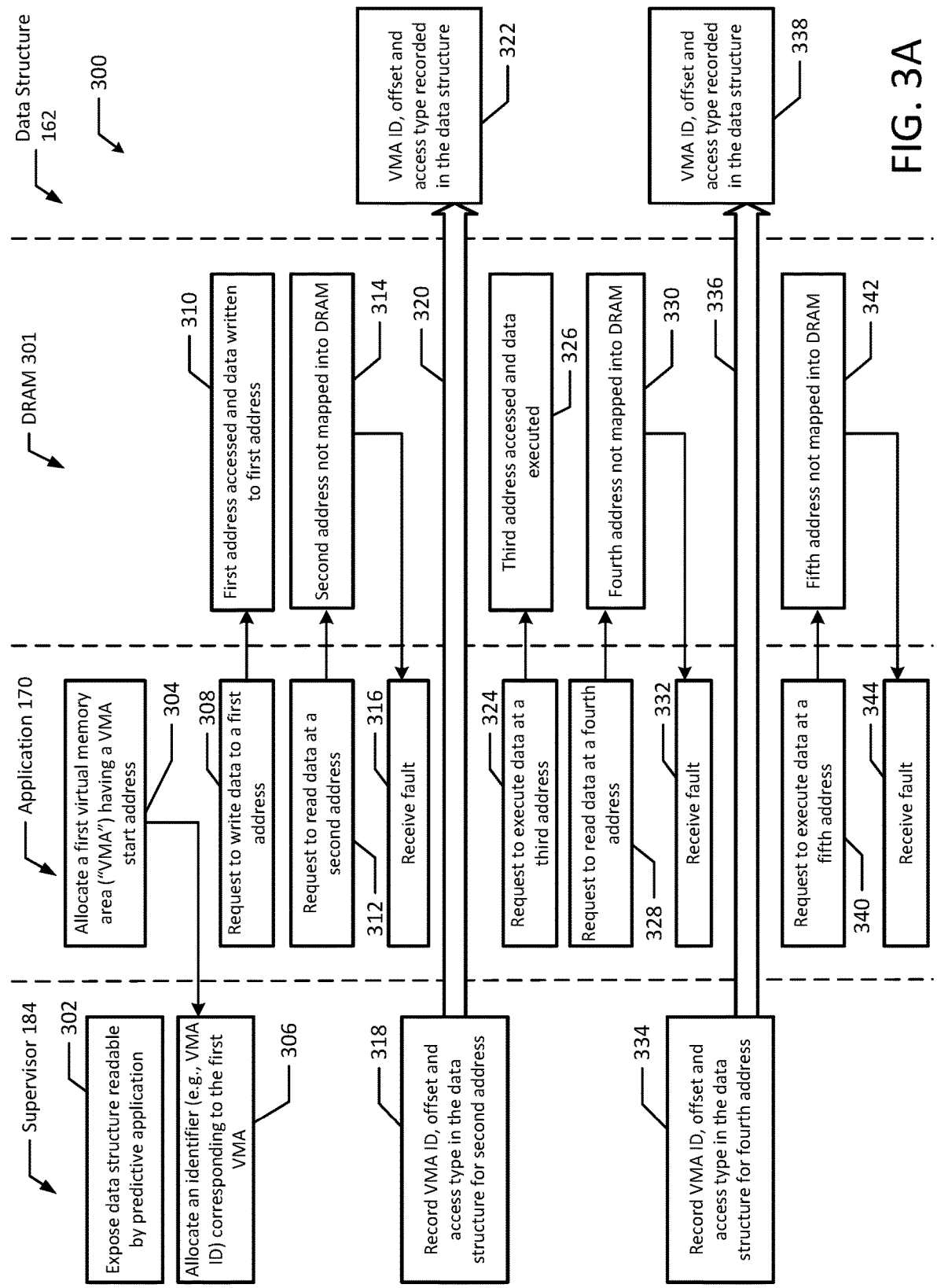

FIGS. 3A and 3B illustrate a flowchart of an example method 300 for prefetching fault data into memory with ASLR in accordance with an example embodiment of the present disclosure. Although the example method 300 is described with reference to the flowchart illustrated in FIGS. 3A and 3B, it will be appreciated that many other methods of performing the acts associated with the method 300 may be used. For example, the order of some of the blocks may be changed, certain blocks may be combined with other blocks, blocks may be repeated, and some of the blocks described are optional. The method 300 may be performed by processing logic that may comprise hardware (circuitry, dedicated logic, etc.), software, or a combination of both. For example, supervisor 184, application 170, predictive application 174, DRAM 301, and data structure 162 may communicate to perform example method 300.

In the illustrated example, the supervisor 184 may expose a data structure 162, which is readable by application 174 (block 302). Additionally, application 170 may allocate a first VMA that has a VMA start address (block 304). For example, the virtual memory area may be a contiguous range of virtual addresses, such as 3 GB of userspace in 4 KB pages. Additionally, the VMA start address may be 0xE12C. Then, the supervisor 184 may allocate an identifier corresponding to the first VMA (block 306). For example, the supervisor 184 may allocate VMA_ID=1 to the first VMA. Other identifiers (e.g., (e.g., sequence counter identifiers) such as alphanumerical characters may be used.

During operation, the application 170 may request to write data to a first address (block 308). For example, the application 170 may request to write data to virtual address 0x3A9D. Then, the first address (e.g., 0x3A9D) may be accessed within the DRAM 301 and the data is written to the first address (block 310). The application 170 may also request to read data at a second address (block 312). For example, the application 170 may request to read data from virtual address 0xA9D9. However, the second address (e.g., 0xA9D9) is not mapped into DRAM 301 (block 314) and the application 170 receives a fault (block 316). For example, even though the page may be accessible to the application 170, the page associated with the address may require a mapping to be added to the application page tables, and may additionally require the actual page contents to be loaded from a backing store such as a disk or other form of memory.

After the fault is triggered, the supervisor 184 records the VMA ID, offset and access type in the data structure 162 for the second address (blocks 318 and 320). Specifically, the supervisor 184 records VMA_ID=1, offset 0x0010, and read in the log or data structure 162. Additionally, the supervisor 184 may record the size of the VMA along with the VMA ID. Then, the VMA ID, the offset and the access type a recorded in the data structure 162 (block 322). This fault information may be used to along with other entries to compile fault statistics and build a predictive model for when the application reboots or performs a later run of similar workloads. In an example, the predictive application 174 may implement the predictive model.

The application 170 may also request to execute data a third address (block 324). In the illustrated example, the third address (e.g., 0x7001) is accessed and the data is executed (block 326). The application 170 also requests to read data at a fourth address (block 328). However, the fourth address (e.g., 0xACA1) is not mapped into DRAM 301 (block 330) and the application 170 receives a fault (block 332).

After the fault is triggered, the supervisor 184 records the VMA ID, offset and access type in the data structure 162 for the fourth address (blocks 334 and 336). Additionally, the supervisor 184 may record the VMA size. Then, the VMA ID, the offset and the access type are recorded in the data structure 162 (block 338). Specifically, the supervisor 184 records VMA_ID=1, offset 0x0020, and read in the log or data structure 162. Again, this fault information may be used to along with other entries (e.g., entry for address 0xA9D9) to compile fault statistics and build a predictive model for when the application reboots or performs a later run of similar workloads. The VMA size may also be recorded in the data structure along with the VMA ID.

The application 170 may also request to execute data at a fifth address (block 340). However, the fifth address (e.g., 0x8001) is not mapped into DRAM 301 (block 342) and the application 170 receives a fault (block 344).

Continuing on FIG. 3B, after the fault is triggered, the supervisor 184 records the VMA ID, offset and access type in the data structure 162 for the fifth address (blocks 346 and 348). Then, the VMA ID, the offset and the access type are recorded in the data structure 162 (block 350). Again, this fault information may be used to along with the previous two entries (e.g., entry for address 0xA9D9 and 0xACA1) to compile fault statistics and build a predictive model for when the application reboots or performs a later run of similar workloads.

After some time, the application 170 may reboot (block 352). For example, the application may have stopped and may be rebooted to perform another run on a similar workload. After the application 170 reboots, the supervisor 184 may expose the data structure 162, which is readable by predictive application 174 (block 354). For example, the supervisor 184 may expose the same data structure that includes the previous fault information from the earlier run. The application 170 may allocate a second virtual memory area (VMA) that has a VMA start address (block 356). The second virtual memory area may be identical to the first virtual memory area. In another example, the second virtual memory area may be different than the first virtual memory area. Additionally, the supervisor 184 may allocate an identifier (e.g., VMA ID) corresponding to the second VMA (block 358). In the illustrated example, the application 170 may allocate the same virtual memory area and the supervisor 184 may allocate the same VMA_ID=1. The VMA ID may be numerical, alphanumerical or some other unique identifier (e.g., sequence counter identifier).

The application 170 may request to read data at the second address (block 360). For example, the application 170 may request to read data from virtual address 0xA7D9. However, the second address is not mapped into DRAM 301 (block 362) and the application receives a fault (block 364).

After the fault is triggered, the supervisor 184 looks up the VMA based on the VMA ID from the fault data (block 366). In an example, the supervisor 184 may also record VMA ID, offset and access type in the data structure for the second address (block 368). This fault information may be used to along with the previous entries to improve the existing predictive model or to build a new predictive model. Then, the supervisor 184 predicts the fault offset(s) (block 370). In an example, the application 170 may predict the fault offset(s). For example, the application 170 may predict the next fault offset, but may be unable to predict the address. The supervisor 184 may also calculate the fault address(es) from the VMA start address and the predicted offset(s) (block 372). Specifically, the supervisor 184 may calculate subsequent fault address(es) by adding the VMA start address and the offset. The supervisor 184 may also calculate the fault offset from the VMA start address and the fault address identified in the fault information. Then, the supervisor 184 fetches data at the second address and prefetches data at the fourth address and fifth address (blocks 372 and 376).

By prefetching data at multiple addresses, the application 170 switches into the supervisor 184 a single time instead of multiple times for the same quantity of data. For example, instead of switching into the supervisor 184 at each triggered fault, a single fault trigger may be used to predict subsequent faults and prefetch data for each subsequent fault, which allows the application 170 to quickly access data from the fastest DRAM 301 instead of waiting for the supervisor 184 to fetch the data from slower storage.

After fetching and prefetching the data, the second address, fourth address and the fifth address are mapped into DRAM 301 (block 378). Then, the application 170 requests to execute data at the third address (block 380). The third address is accessed and the data is executed (block 382). Additionally, the application 170 requests to read data at the fourth address (block 384) and data at the fourth address is read because it was prefetched into DRAM 301 without switching to the supervisor 184 (block 386). The supervisor 184 advantageously prefetches the data, which improves speed without sacrificing the security afforded by ASLR.

Figure 4:
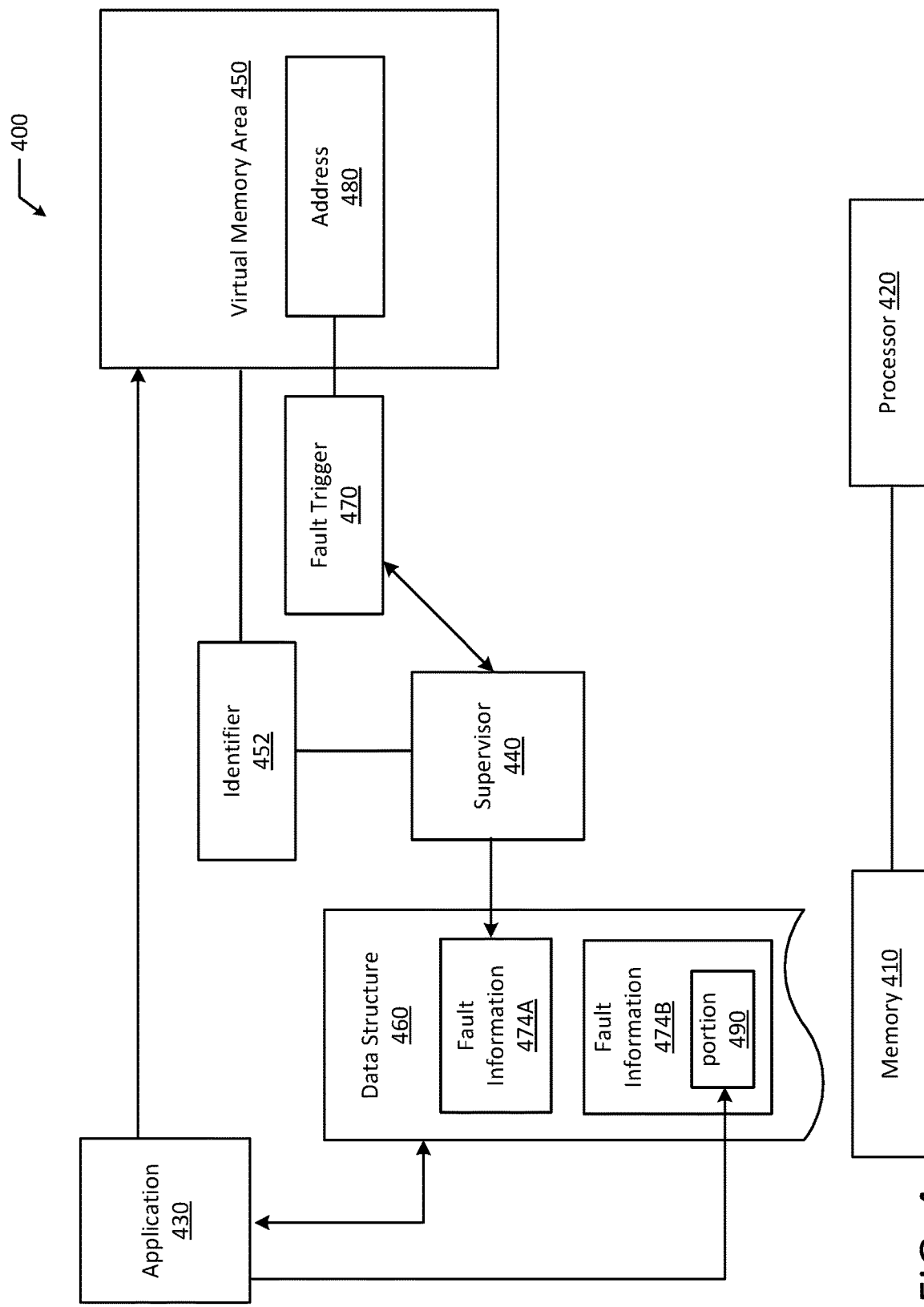
FIG. 4 illustrates a block diagram of an example prefetching system according to an example embodiment of the present disclosure.

FIG. 4 is a block diagram of an example prefetching system 400 according to an example embodiment of the present disclosure. The system 400 includes a memory 410, a processor 420 in communication with the memory 410, an application 430 (e.g., predictive application), and a supervisor 440. The supervisor 440 is configured to allocate an identifier 452 corresponding to a VMA 450 and expose a data structure 460 that is readable by the application 430 (e.g., predictive application). Responsive to a fault trigger 470 associated with an address 480, the supervisor 440 is configured to record fault information 474A in the data structure 460.

Additionally, the application 430 is configured to predict at least a portion 490 of subsequent fault information 474B based on the fault information 474A recorded in the data structure 460. By predicting subsequent fault information and prefetching data, the system advantageously improves speed and performance while maintaining the higher security of ASLR.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as application specific integrated circuits (ASICs), field programmable gate arrays (FPGAs), digital signal processors (DSPs) or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
   a memory;
   a processor in communication with the memory;
   an application; and
   a supervisor, wherein the supervisor is configured to:
      allocate an identifier corresponding to a virtual memory area ("VMA"),
      expose a data structure that is readable by the application,
      responsive to a fault trigger associated with an address, record fault information in the data structure, and
   wherein the application is configured to:
      predict at least a portion of subsequent fault information based on fault information recorded in the data structure, wherein the application is a userspace application.

2. The system of claim 1, wherein the data structure is one of a training file, a log, and a supervisor prediction model.

3. The system of claim 1, wherein the fault information includes the identifier corresponding to the VMA, an offset, and an access type.

4. The system of claim 3, wherein the access type is at least one of read, write, and execute.

5. The system of claim 3, wherein the offset is calculated as the address minus a start address of the VMA.

6. The system of claim 1, wherein the supervisor is configured to prefetch fault data based on the prediction.

7. The system of claim 1, wherein the supervisor is further configured to record additional fault information in the data structure responsive to an additional fault trigger associated with an additional address.

8. The system of claim 7, wherein at least one of the application and the supervisor is configured to predict a pattern of subsequent fault information based at least partially on the fault information and the additional fault information recorded in the data structure.

9. The system of claim 8, wherein the supervisor is configured to prefetch a plurality of data associated with each predicted address in the pattern of subsequent fault information.

10. The system of claim 1, wherein the supervisor is further configured to:
expose an interface to receive new fault information from the application, wherein the fault information is recorded in the data structure,
receive the new fault information,
look up the VMA defined in the data structure based on the identifier,
calculate a fault offset from the VMA start address and the fault address identified in the fault information, and
prefetch fault data into the memory based on the fault address.

11. A method comprising:
allocating, by a user application, an identifier corresponding to a virtual memory area ("VMA");
exposing, by a supervisor, a data structure that is readable by an application;
responsive to a fault trigger associated with an address, recording, by the supervisor, fault information in the data structure; and
predicting, by the application, at least a portion of subsequent fault information based on the fault information recorded in the data structure.

12. The method of claim 11, wherein the fault information includes the identifier corresponding to the VMA, an offset, and an access type.

13. The method of claim 11, wherein the fault information further comprises the VMA size.

14. The method of claim 11, further comprising prefetching, by the supervisor, data based on the prediction.

15. The method of claim 11, further comprising:
responsive to an additional fault trigger, recording, by the supervisor, additional fault information in the data structure;
predicting, by the application, a pattern of subsequent fault information based at least partially on the fault information and the additional fault information recorded in the data structure; and
prefetching, by the supervisor, a plurality of fault data associated with each predicted address in the pattern of subsequent fault information.

16. A non-transitory machine readable medium storing code, which when executed by a processor, causes at least one of a user application and a supervisor to:
allocate, by the user application, an identifier corresponding to a virtual memory area ("VMA");
expose a data structure that is readable by an application;
responsive to a fault trigger associated with an address, record fault information in the data structure; and
predict at least a portion of subsequent fault information based on the fault information recorded in the data structure.

17. The non-transitory machine readable medium of claim 16, which further causes the supervisor to prefetch fault data based on the prediction.

18. The non-transitory machine readable medium of claim 16, which further causes the supervisor to:
responsive to an additional fault trigger, record additional fault information in the data structure;
predict a pattern of subsequent fault information based at least partially on the fault information and the additional fault information recorded in the data structure; and
prefetch a plurality of data associated with each predicted address in the pattern of subsequent fault information.

* * * * *